US012200479B2

(12) United States Patent
Schmitt

(10) Patent No.: US 12,200,479 B2
(45) Date of Patent: Jan. 14, 2025

(54) SYSTEM AND METHOD FOR PHONE PRIVACY

(71) Applicant: The Trustees of Princeton University, Princeton, NJ (US)

(72) Inventor: Paul Schmitt, Palo Alto, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 17/419,895

(22) PCT Filed: Mar. 2, 2021

(86) PCT No.: PCT/US2021/020435
§ 371 (c)(1),
(2) Date: Jun. 30, 2021

(87) PCT Pub. No.: WO2021/178387
PCT Pub. Date: Sep. 10, 2021

(65) Prior Publication Data
US 2022/0400375 A1 Dec. 15, 2022

Related U.S. Application Data

(60) Provisional application No. 63/079,796, filed on Sep. 17, 2020, provisional application No. 62/984,386, filed on Mar. 3, 2020.

(51) Int. Cl.
*H04W 12/02* (2009.01)
*H04W 4/24* (2024.01)
(Continued)

(52) U.S. Cl.
CPC ........... *H04W 12/02* (2013.01); *H04W 12/06* (2013.01); *H04W 12/40* (2021.01); *H04W 12/63* (2021.01); *H04W 12/72* (2021.01); *H04W 4/24* (2013.01)

(58) Field of Classification Search
CPC ..... H04W 92/18; H04W 80/02; H04W 48/16; H04W 12/06; H04W 60/00; H04W 76/15;
(Continued)

(56) References Cited

U.S. PATENT DOCUMENTS

2002/0131581 A1 9/2002 Wittke et al.
2009/0193509 A1* 7/2009 Cardone ................ H04L 63/08
726/9
(Continued)

OTHER PUBLICATIONS

International Search Report and Written Opinion for corresponding PCT Application No. PCT/US21/02435, dated May 21, 2021.
(Continued)

*Primary Examiner* — Kwasi Karikari
(74) *Attorney, Agent, or Firm* — MEAGHER EMANUEL LAKS GOLDBERG & LIAO, LLP

(57) ABSTRACT

According to various embodiments, a cellular architecture for enhanced privacy regarding identity and location of a computing device is disclosed. The architecture includes a next generation core (NGC). The NGC includes an authentication server function (AUSF) configured to determine whether the computing device contains a valid subscriber identity module (SIM) card, and a user plane function (UPF) configured to allow a computing device to connect to the Internet. The architecture further includes a gateway connected to the UPF, the gateway configured to authenticate the computing device while hiding the identity of the computing device by verifying authentication tokens that represent units of access.

28 Claims, 11 Drawing Sheets

(51) Int. Cl.
    *H04W 12/06*     (2021.01)
    *H04W 12/40*     (2021.01)
    *H04W 12/63*     (2021.01)
    *H04W 12/72*     (2021.01)

(58) Field of Classification Search
CPC ....... H04W 4/24; H04W 12/04; H04W 12/08; H04W 12/041; H04W 12/03; H04W 12/10; H04W 12/106; H04W 12/0431; H04W 12/72; H04W 12/0433; H04W 12/00; H04W 12/0471; H04W 12/50; H04W 56/002; H04W 12/086
See application file for complete search history.

(56) References Cited

U.S. PATENT DOCUMENTS

| | | | |
|---|---|---|---|
| 2010/0024045 | A1 | 1/2010 | Sastry et al. |
| 2012/0167189 | A1* | 6/2012 | Aichroth ............... H04L 9/3218 726/7 |
| 2013/0150000 | A1* | 6/2013 | Wong .................. H04L 63/0807 455/411 |
| 2013/0268357 | A1 | 10/2013 | Heath |
| 2013/0273886 | A1 | 10/2013 | Mohajeri |
| 2015/0341295 | A1* | 11/2015 | Kato ....................... H04L 51/48 709/206 |
| 2016/0359632 | A1 | 12/2016 | Mohajeri et al. |
| 2018/0376384 | A1 | 12/2018 | Youn et al. |
| 2020/0153830 | A1* | 5/2020 | Li .......................... H04L 9/3242 |
| 2021/0014765 | A1* | 1/2021 | Shan ..................... H04W 36/14 |

OTHER PUBLICATIONS

Shekhtman. "Phones vulnerable to location tracking even when GPS services off", The Trustees of Princeton University, Nov. 29, 2017 (Nov. 29, 2017).

Myrto Arapini et al., "New privacy issues in mobile telephony: Fix and verification", Proceedings of the 2012 ACM Conference on Computer and Communications Security, CCS '12, pp. 205-216 Raleigh, North Carolina, USA, 2012.

David L Chaum, "Untraceable electronic mail, return addresses, and digital pseudonyms", Communications of the ACM, vol. 24, No. 2, pp. 84-90, 1981.

Hiten Choudhury et al., "Enhancing user identity privacy in lte", Proceedings of the 2012 IEEE 11th International Conference on Trust, Security and Privacy in Computing and Communications, TRUSTCOM '12, pp. 949-957, Washington, DC, USA, 2012.

Henry Corrigan-Gibbs et al., "Riposte: An anonymous messaging system handling millions of users", Proceedings of the 2015 IEEE Symposium on Security and Privacy, pp. 321-338, Sep. 15, 2015.

Henry Corrigan-Gibbs et al., "Dissent: ac-countable anonymous group messaging", Proceedings of ACM CCS, pp. 340-350, 2010.

Roger Dingledine et al., "Tor: The second-generation onion router", Proceedings of USENIX Security, Aug. 9-13, 2004.

Tobias Engel, "Locating mobile phones using signalling system 7", 25th Chaos communication congress, 2008.

Syed Rafiul Hussain et al., "LTEInspector: A systematic approach for adversarial testing of 4G LTE", Network and Distributed System Security Symposium, NDSS, pp. 1-15, San Diego, California, USA, Feb. 18-21, 2018.

Syed Rafiul Hussain et al., "Privacy Attacks to the 4G and 5G Cellular Paging Protocols Using Side Channel Information", Network and Distributed System Security Symposium, NDSS, pp. 1-15, San Diego, California, USA, Feb. 24-27, 2019.

Mohammed Shafiul Alam Khan, et al., "Trashing imsi catchers in mobile networks", Proceedings of the 10th ACM Conference on Security and Privacy in Wireless and Mobile Networks, WiSec '17, pp. 207-218, Boston, Massachusetts, 2017.

G. M. Køien, "Privacy enhanced mutual authentication in lte", 2013 IEEE 9th International Conference on Wireless and Mobile Computing, Networking and Communications (WiMob), pp. 614-621, Lyon, France, Oct. 2013.

Denis Foo Kune et al., "Location leaks on the gsm air inter-face", ISOC NDSS (Feb. 2012), 2012.

David Lazar et al., "Alpenhorn: Boot-strapping secure communication without leaking metadata", 12th USENIX Symposium on Operating Systems Design and Implementation (OSDI 16), pp. 571-586, Savannah, GA, 2016. USENIX Association.

P. P. C. Lee et al., "On the detection of signaling dos attacks on 3g wireless networks", IEEE INFOCOM 2007—26th IEEE International Conference on Computer Communications, pp. 1289-1297, May 2007.

G Lorenz et al., "Securing ss7 telecommunications networks", Workshop on Information Assurance and Security, vol. 2, pp. 273-278, 2001.

C. Peeters et al, "Sonar: Detecting SS7 Redirection Attacks with Audio-Based Distance Bounding", 2018 IEEE Symposium on Security and Privacy (SP),pp. 567-582, May 2018.

D. Rupprecht et al., "Breaking LTE on layer two", 2019 IEEE Symposium on Security and Privacy (SP), pp. 1121-1136, May 2019.

Hemant Senga et al., "Ss7 over ip: signaling interworking vulnerabilities", IEEE Network, vol. 20, No. 6, pp. 32-41, Nov./Dec. 2006.

Altaf Shaik et al., "Practical attacks against privacy and availability in 4g/lte mobile communication systems", CoRR, abs/1510.07563, 2015.

Keen Sung et l., "Location privacy without carrier cooperation", IEEE Workshop on Mobile Security Technologies, MOST, p. 148, 2014.

Fabian van den Broek et al., "Defeating IMSI catchers", ACM SIGSAC Conference on Computer and Communications Security, CCS '15, pp. 340-351, Denver, Colorado, USA, Oct. 12-16, 2015.

Jelle van den Hooff et al., "Vuvuzela: Scalable private messaging resistant to traffic analysis", Proceedings of the 25th Symposium on Operating Systems Principles, SOSP '15, p. 137—Monterey, California, Oct. 4-7, 2015.

Byeongdo Hong et al., Guti reallocation demystified: Cellular location tracking with changing temporary identifier:, Network and Distributed System Security Symposium, NDSS, p. 1—San Diego, California, USA, Feb. 18-21, 2018.

Syed Rafiul Hussain et al., "5GReasoner: A property-directed security and privacy analysis frame-work for 5G cellular network protoco", Proceedings of the 2019 ACM SIGSAC Conference on Computer and Communications Security, CCS '19, pp. 669-684, London, United Kingdom, Nov. 11-15, 2019.

Supplementary European Search Report for corresponding EP Application No. 21764513, dated Feb. 19, 2024.

\* cited by examiner

| Identifier | Allocator | Duration |
|---|---|---|
| IMSI | Operator | Permanent |
| GUTI | AMF | Temporary |
| IP Address (static) | Operator | Permanent |
| IP Address (dynamic) | UPF | Temporary |
| RNTI | gNodeB | Temporary |

*FIG. 2*

| | | Attack Type | |
|---|---|---|---|
| | | Bulk | Targeted |
| Visibility | Global | Carrier Logs [18, 19, 39, 70] / Government Surveillance [9] | Carrier Paging |
| | Local | SDR [3, 50, 69] / IMSI Catcher [37, 52] | Paging Attack [34, 42] |

*FIG. 4*

| Scheme | Customer? | Anonymous? | Unique? |
|---|---|---|---|
| Standard Auth | ● | | |
| Group/Ring Sig | ● | ● | |
| Linkable Ring Sig | ● | | ● |
| Cryptocurrency | ● | ● | ● |
| PGPP Tokens | ● | ● | ● |

*FIG. 5*

SYSTEM AND METHOD FOR PHONE PRIVACY

CROSS-REFERENCE TO RELATED APPLICATIONS

This application claims priority to provisional applications 62/984,386 and 63/079,796, filed Mar. 3, 2020 and Sep. 17, 2020, respectively, which are herein incorporated by reference in their entirety.

STATEMENT REGARDING FEDERALLY SPONSORED RESEARCH OR DEVELOPMENT

This invention was made with government support under Grant No. CNS-1602399 awarded by the National Science Foundation. The government has certain rights in the invention.

FIELD OF THE INVENTION

The present invention relates generally to cellular architecture and, more particularly, to a system and method for protecting user identity and location privacy without changing physical infrastructure, without added latency, and without a requirement of direct cooperation with existing operators.

BACKGROUND OF THE INVENTION

Cellular phone and data networks are an essential part of the global communications infrastructure. In the United States, there are 124 cellular subscriptions for every 100 people and the total number of cellular subscriptions worldwide now stands at over 8.2 billion. Unfortunately, today's cellular architecture embeds privacy assumptions of a bygone era. In decades past, providers were highly regulated and centralized, few users had mobile devices, and data broker ecosystems were undeveloped. As a result, except for law enforcement access to phone records, user privacy was generally preserved. Protocols that underpin cellular communication embed an assumption of trusted hardware and infrastructure, and specifications for cellular backend infrastructure contain few formal prescriptions for preserving user data privacy. The result is that the locations of all users are constantly tracked as they simply carry a phone in their pocket, without even using it.

Much has been made of privacy enhancements in recent cellular standards (e.g., 5G), but such changes do nothing to prevent cellular carriers from tracking user locations. Worse still, the 5G push toward small cells results in much finer-grained location information, and thus tracking, than previous generations.

In recent years it has been extensively reported that mobile carriers have been routinely selling and leaking mobile location data and call metadata of hundreds of millions of users. Unfortunately for users, this behavior by the operators appears to have been legal, and has left mobile users without a means of recourse due to the confluence of a deregulated industry, high mobile use, and the proliferation of data brokers in the landscape. As a result, in many countries, every mobile user can be physically located by anyone with a few dollars to spend. This privacy loss is ongoing and is independent of leakage by apps that users choose to install on their phones (which is a related but orthogonal issue).

While this major privacy issue has long been present in the architecture, the practical reality of the problem and lack of technical countermeasures against bulk surveillance is beyond what was known before. However, there is a fundamental technical challenge at the root of this problem: even if steps were taken to limit the sale or disclosure of user data, such as by passing legislation, the cellular architecture generally and operators specifically would still seemingly need to know where users are located in order to provide connectivity. Thus, as things stand, users must trust that cellular network operators will do the right thing with respect to privacy despite not having done so to date.

SUMMARY OF THE INVENTION

According to various embodiments, a cellular architecture for enhanced privacy regarding identity and location of a computing device is disclosed. The architecture includes a next generation core (NGC). The NGC includes an authentication server function (AUSF) configured to determine whether the computing device contains a valid subscriber identity module (SIM) card, and a user plane function (UPF) configured to allow a computing device to connect to the Internet. The architecture further includes a gateway connected to the UPF, the gateway configured to authenticate the computing device while hiding the identity of the computing device by verifying authentication tokens that represent units of access.

According to various embodiments, a cellular architecture for enhanced privacy regarding identity and location of a computing device is disclosed. The architecture includes an evolved packet core (EPC). The EPC includes a mobility management entity (MME) configured to determine whether the computing device contains a valid subscriber identity module (SIM) card, and a packet data network gateway (P-GW) configured to allow a computing device to connect to the Internet. The architecture further includes a privacy gateway connected to the P-GW, the privacy gateway configured to authenticate the computing device while hiding the identity of the computing device by verifying authentication tokens that represent units of access.

According to various embodiments, a method for providing enhanced privacy regarding identity and location of a computing device in a cellular architecture is disclosed. The architecture includes a next generation core (NGC) and a gateway. The NGC includes an authentication server function (AUSF) and user plane function (USF). The method includes determining via the AUSF whether the computing device contains a valid subscriber identity module (SIM) card. The method further includes authenticating via the gateway the computing device while hiding the identity of the computing device by verifying authentication tokens that represent units of access. The method additionally includes allowing via the USF a computing device to connect to the Internet.

According to various embodiments, a cellular architecture for enhanced privacy regarding identity and location of a computing device is disclosed. The architecture includes a gateway outside of a cellular core, the gateway configured to authenticate the computing device while hiding the identity of the computing device by verifying authentication tokens that represent units of access.

According to various embodiments, a cellular architecture for enhanced privacy regarding identity and location of a computing device is disclosed. The architecture includes a cellular core. The cellular core includes a back-end authentication database configured to determine whether the computing device contains a valid subscriber identity module (SIM) card, and a core packet forwarding gateway configured to allow a computing device to connect to the Internet. The architecture further includes a privacy gateway connected to the core packet forwarding gateway, the privacy gateway configured to authenticate the computing device while hiding the identity of the computing device by verifying authentication tokens that represent units of access.

According to various embodiments, a cellular architecture for enhanced privacy regarding identity and location of a computing device is disclosed. The architecture includes a gateway outside of a cellular core, the gateway configured to authenticate the computing device while hiding the identity of the computing device by accepting cryptocurrency payments that represent units of access.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 2 depicts a table of user identifiers in LTE according to an embodiment of the present invention;

FIG. 4 depicts a table of common cellular attacks according to an embodiment of the present invention;

FIG. 5 depicts a table of properties needed for user authentication in a privacy-preserving cell network and schemes to achieve them according to an embodiment of the present invention;

DETAILED DESCRIPTION OF THE INVENTION

Figure 1:
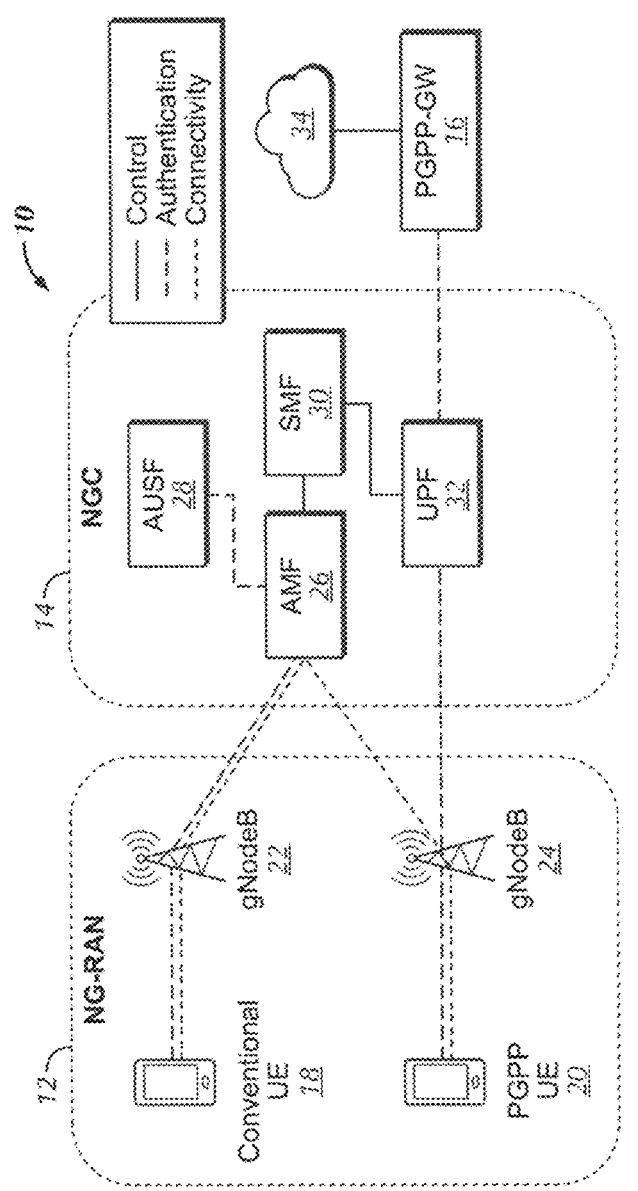
FIG. 1 depicts simplified 5G architecture according to an embodiment of the present invention.

To receive service in today's cellular architecture, phones uniquely identify themselves to towers and thus to operators. This is now a cause of major privacy violations, as operators sell and leak identity and location data of hundreds of millions of mobile users. Therefore, generally disclosed herein are embodiments for a system and method that enable protection of user identity and location privacy without changes to physical infrastructure, without added latency, and without a requirement of direction cooperation from existing operators. Embodiments of the disclosed approach, which may be referred to herein as Pretty Good Phone Privacy (PGPP), are described herein and demonstrated to work with real phones to provide privacy-preserving connectivity. It is shown herein how PGPP maintains current control overheads while significantly improving user identity and location privacy.

Generally disclosed herein are identified points of decoupling in the cellular architecture to protect user privacy in a way that is immediately deployable. This is aided by an industry-wide shift toward software-based cellular cores. Whereas prior generations of cellular networks ran on highly specific hardware, many modern cellular core functions are run in software, making it more amenable to key changes.

In embodiments of the disclosed approach, users are protected against location tracking, even by their own carrier. Network connectivity is decoupled from authentication and billing, which allows the carrier to run Next Generation Core (NGC) services that are unaware of the identity or location of their users but while still authenticating them for network use. This architectural change allows for nullifying the value of the user's international mobile subscriber identity (IMSI), an often targeted identifier in the cellular ecosystem, as a unique identifier. Authentication and billing functionality is shifted to outside of the cellular core and traditional cellular credentials are separated from credentials used to gain global connectivity.

It is anticipated that the disclosed approach can be most likely deployed by Mobile Virtual Network Operators (MVNOs), where the MVNO operates the core (NGC) while the base stations (gNodeBs) are operated by a Mobile Network Operator (MNO). This allows for architectural independence as the MVNO can alter its core functionality, so long as the NGC conforms to LTE/5G standards. While it is not strictly necessary for PGPP to be adopted by an MVNO, it is assumed that existing industry players (e.g., MNOs) are unlikely to adopt new technologies or have an interest in preserving user privacy unless legal remedies are instituted. As a result, it is considered how privacy can be added on top of today's mobile infrastructure by new industry entrants.

A prototype implementation of PGPP is described herein. In doing so, several key challenges are examined in achieving privacy in today's cell architecture. Considered herein are: 1) which personal identifiers are stored and transmitted within the cellular infrastructure; 2) which core network entities have visibility into them (and how this can be mitigated); 3) which entities can provide privacy and with what guarantees; and 4) how we can provide privacy while maintaining compatibility with today's infrastructure and without requiring the cooperation of established providers.

PGPP's impact on control traffic and on user anonymity is shown. It is shown that by altering the network coverage map, control traffic headroom can be gained compared with today's networks; that headroom can then be consumed in exchange for improved anonymity. The privacy improvements are analyzed against a variety of common cellular attacks, including those based on bulk surveillance as well as targeted attacks. It is found that PGPP significantly increases anonymity where there is none today. For instance, an example PGPP network can increase the geographic area that an attacker could believe a victim to be within by ~1,200% with little change in control load.

Cellular Architecture Overview

The 5G architecture 10 can be divided into two areas: the Next Generation Radio Access Network (NG-RAN) 12, which is responsible for radio access, and the Next Generation Core (NGC) 14, which includes the entities responsible for authentication and connectivity to the network core. More generally (i.e., not limited to just 5G architectures), a cellular architecture includes a radio access network (RAN) 12 and a cellular core 14. FIG. 1 shows a simplified architecture 10 for both standard cellular as well as with PGPP. PGPP moves authentication and billing to a new entity, the PGPP-GW 16, that is external to the NGC 14 and described in further detail below.

NG-RAN 12:

The NG-RAN 12 is the network that facilitates connectivity between user devices (UEs) 18, 20, commonly a cell phone with a SIM card installed, and the serving base station (gNodeB) 22, 24. It is to be noted while the term user device 18, 20 is used herein, any computing device that can connect to the NGC 14 can be included in the NG-RAN. For instance, devices that may not require a user, such as sensors and Internet of Things (IoT) devices, may also be included. The NG-RAN 12 is responsible for providing UEs 18, 20 a means of connecting to the NGC 14 via gNodeBs 22, 24.

NGC 14:

The NGC 14 is the core of the 5G cellular network and includes entities that provide authentication, billing, voice, SMS, and data connectivity. The NGC entities relevant to embodiments of the disclosed invention are the Access and Mobility Management Function (AMF) 26, the Authentication Server Function (AUSF) 28, the Session Management Function (SMF) 30, and the User Plane Function (UPF) 32. The AMF 26 is the main point of contact for a UE 18, 20 and is responsible for orchestrating mobility and connectivity. UEs 18, 20 authenticate to the network by sending an identifier that is stored in the SIM to the AMF 26. The AUSF 28 is then queried to verify that the UE 18, 20 is a valid subscriber. Once the UE 18, 20 is authenticated, the AMF 26 assigns the UE 18, 20 to an SMF 30 and UPF 32, which offer an IP address and connectivity to the Internet. The SMF 30 allocates IPs and the UPF 32 handles packet forwarding for ingress/egress between the NGC 14 and the Internet. Note that 5G networks can include many copies of these entities and contain many more entities; however, for the purposes of the disclosed invention, this simplified model suffices.

More generally (i.e., not limited to just 5G architectures), a cellular core 14 includes am entity responsibility for mobility management 26, a back-end authentication database 28, an entity for internally managing session connectivity 30, and a core packet forwarding gateway 32 that manages ingress/egress between the core network 14 and the global Internet 36.

MVNOs:

Embodiments of the disclosed invention are configured to be implemented by a Mobile Virtual Network Operator (MVNO). MVNOs are virtual in that they offer cellular service without owning the infrastructure itself. Rather, MVNOs pay to share capacity on the infrastructure that an underlying carrier operates. MVNOs can choose whether they wish to operate their own core entities such as the AMF, AUSF, and UPF, which is the type of operation disclosed herein. MVNOs that run their own core network are often called "full" MVNOs. Critically, the disclosed architecture is more feasible as the industry moves toward "whitebox" gNodeBs that connect to a central office that is a datacenter with virtualized NGC services. Recent work has shown that dramatic performance gains are possible using such newer architectures.

4G LTE Architecture:

While embodiments of the invention are described herein with respect to a 5G cellular architecture, the embodiments could also be implemented in a 4G LTE architecture. Therefore, a brief description of a 4G LTE architecture will be included as well.

The 4G LTE architecture can be divided into two areas: an Evolved UMTS Terrestrial Radio Access Network (EU-TRAN), which is composed of the entities responsible for radio access; and the Evolved Packet Core (EPC), which includes the entities responsible for authentication and access to the network core.

The E-UTRAN is the network that facilitates connectivity between UEs and the serving base station (eNodeB). The E-UTRAN is responsible for providing UEs a means of connecting to the EPC via eNodeBs.

The EPC is the core of the cellular network and includes entities that provide authentication, billing, voice, SMS, and data connectivity. The EPC entities relevant herein are the Mobility Management Entity (MME), the Home Subscriber Server (HSS), and the Serving and Packet Data Network Gateways (S-GW and P-GW, respectively). The MME is the main point of contact for a UE and is responsible for orchestrating mobility and connectivity. UEs authenticate to the network by sending an identifier that is stored in the SIM to the MME. The HSS is then queried to verify that the UE is a valid subscriber. Once the UE is authenticated, the MME assigns the UE to an S-GW and P-GW, which offer an IP address and connectivity to the Internet. Note that LTE networks can include many copies of these entities and contain many more entities; however, for the purposes of the disclosed invention this simplified model suffices.

Privacy in the Cellular Architecture

Maintaining user privacy is challenging in cellular networks, both past and present as it is not a primary goal of the architecture. To authenticate users for access and billing purposes, networks use globally unique client identifiers. Likewise, the cellular infrastructure itself must always "know" the location of a user in order to minimize latency when providing connectivity. Cellular identifiers are briefly described as well as location information available from the perspective of the cell network in this section. Acronyms from the 5G architecture are used here as it is the newest standard; however, similar entities exist in all generations (2G, 3G, 4G LTE).

User and Device Identifiers:

There are multiple identifiers that can be used to associate network usage with a given subscriber. Identifiers can be assigned by various actors in the ecosystem, they can vary in degree of permanence, and they can be globally unique across all cellular operators or they can be locally unique within a given network. The table in FIG. 2 shows these identifiers, their allocators, and their permanence.

The International Mobile Subscriber Identity (IMSI) is the identifier used to gain access to the network when a phone (UE) 18, 20 performs initial attachment. The IMSI is globally unique, permanent, and is stored on the SIM card. Carriers maintain a AUSF 28 database containing the list of IMSIs that are provisioned for use on the network and subscription details for each. Because the IMSI is globally unique and permanent, it is seen as a high-value target for those who wish to surveil cellular users. For example, in recent years there has been a rise of cell-site simulators, also known as IMSI catchers. These devices offer what appears to be a legitimate base station (gNodeB) signal. Since UE baseband radios are naïve and automatically connect to the strongest signal, they will attempt to attach to the IMSI catcher and offer their IMSI. IMSI catchers have been used extensively by law enforcement as well as nation-state adversaries to identify and eavesdrop on cellular users.

Given the IMSI's importance and sensitivity, temporary identifiers are often used instead. The Globally Unique Temporary Identifier (GUTI) can be thought of as a temporary replacement for an IMSI. Once a phone attaches to the network, the Access and Mobility Management Function (AMF) 26 generates a GUTI value that is sent to the UE 18, 20, which stores the value. The UE 18, 20 uses the GUTI rather than the IMSI when it attaches to the network in the future. The GUTI can be changed by the AMF 26 periodically. GUTIs are often predictable with consistent patterns, thus offering little privacy, but this can be remedied with a lightweight fix that is expected to be used going forward.

The 5G network is Internet protocol (IP)-based, meaning UEs 18, 20 must be given IP addresses in order to connect. IPs can be either statically or dynamically assigned to UEs 18, 20. Statically assigned IPs are stored in a backend core database. During the attach procedure, the AMF 26 retrieves the static IP address assigned to the UE 18, 20 from the backend. Conversely, dynamic addresses are assigned by the SMF 26 when the UE attaches. Providers can associate a user with an IP address in the network by monitoring traffic at the UPF 32, which offers a convenient location to place a network tap.

In order to connect with the gNodeB 22, 24 over the NG-RAN 12, UE's 18, 20 must be assigned radio resources at layer 2 (layer 2 meaning simple connectivity between local entities), including a temporary unique identifier, the radio network temporary identifier (RNTI). Layer 2 information used on the NG-RAN 12 can be used to link RNTIs with temporary identifiers (e.g., GUTIs) at higher layers (e.g., IP, transport protocols, applications themselves) provided the attacker knows the GUTI beforehand. This attack is specific to the coverage area of a single cell, and can be mitigated by changing the GUTI frequently.

User Location Information:

Cellular networks maintain knowledge of the physical location of each UE 18, 20. Location information is necessary to support mobility and to quickly find the UE 18, 20 when there is an incoming call, SMS, or data for a user. The mechanism used to locate a UE 18, 20 is known as "paging" and it relies on logical groupings of similarly located gNodeB's 22, 24 known as "tracking areas" (TAs). Each gNodeB 22, 24 is assigned to a single TA. TAs can be thought of as broadcast domains for paging traffic. If there is incoming data for an idle UE 18, 20, the paging procedure is used, where the network sends a paging message to all gNodeBs 22, 24 in the user's last-known TA. The paging mechanism can be leveraged by attackers that know an identifier of the victim (e.g., phone number, WhatsApp ID) to generate paging messages intended for the victim, which enables an unprivileged attacker to identify a specific user's location. From an external perspective, the vantage point of remote servers on the web can also be leveraged to localize mobile users given timing information from applications on their devices.

Cellular operators often store location metadata for subscribers, giving them the ability to trace user movement and location history. This bulk surveillance mechanism has been used to establish a user's past location by law enforcement.

The Need for Privacy Enhancements

This section demonstrates the privacy leakage that exists in today's cellular architecture by conducting a measurement study while acting as a relatively weak attacker in a real-world environment. Recall from earlier that the IMSI is a globally unique, permanent identifier. Unfortunately for user privacy, the traditional cellular architecture uses IMSIs for authentication and billing, as well as providing connectivity, causing the IMSI to be transmitted for multiple reasons.

Because of its importance and permanence, the IMSI is seen as a high-value target for those who wish to surveil cellular users. For example, in recent years there has been a proliferation of cell-site simulators, also known as IMSI catchers. These devices offer what appears to be a legitimate base station (gNodeB) signal. Since UE baseband radios are naïve and automatically connect to the strongest signal, they attempt to attach to the IMSI catcher and offer their IMSI. IMSI catchers have been used extensively by law enforcement and_state-level surveillance agencies, with and without warrants, to identify, track, and eavesdrop on cellular users.

Dataset:

A dataset of cellular broadcast traces that were gathered is analyzed in a small, densely populated area with roughly 80,000 residents over the course of several days. The traces include messages that were sent on broadcast channels in plaintext for three cellular providers that offer service in the area. Traces were captured using software defined radios and mobile phones. The trace dataset provides a vantage point that is akin to an IMSI catcher.

Figure 3A:
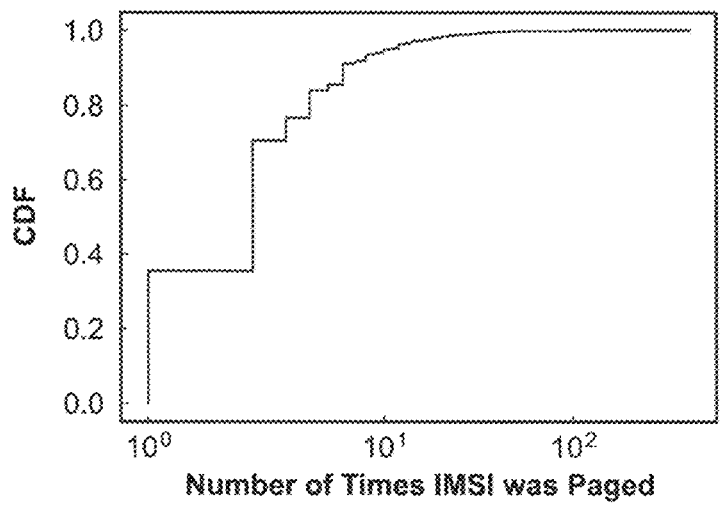
FIG. 3(a) depicts IMSI page counts according to an embodiment of the present invention.

IMSIs Are Often Broadcast In-The-Clear:

It is discovered that, while the architecture is designed to largely use temporary GUTIs once UEs are connected, IMSIs are often present in paging messages. Overall, 588, 921 total paging messages are seen, with 38,917 containing IMSIs (6.6% of all pages). Of those messages, 11,873 unique IMSIs are seen. The number of times each individual IMSI was paged is tracked and a cumulative distribution function (CDF) is plotted in FIG. 3(a). As shown, more than 60% of IMSIs were paged more than once in the traces. Note that multiple pages seen are counted within one second as a single page. Given this network behavior, even a passive eavesdropper could learn the permanent identifiers of nearby users.

Figure 3B:
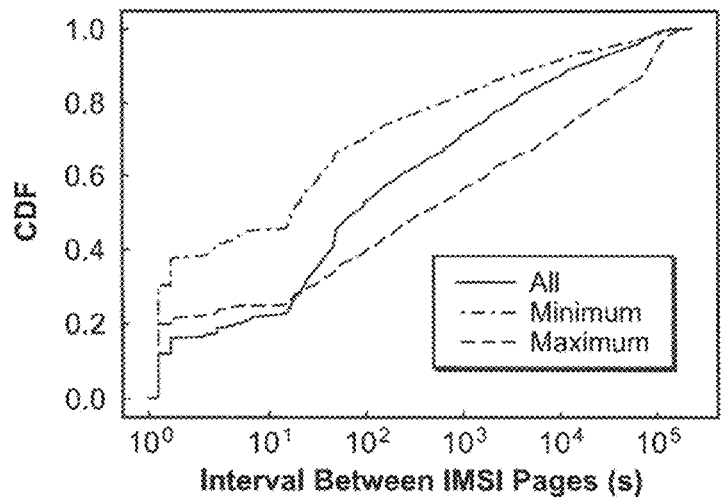
FIG. 3(b) depicts intervals between pages according to an embodiment of the present invention.

IMSIs Can Be Tracked Over Time:

Given that IMSIs are regularly broadcast, an eavesdropper can track the presence or absence of users over time. The intervals between pages containing individual IMSIs are investigated. In FIG. 3(b), a CDF of intervals (greater than one second) between subsequent pages of individual IMSIs is plotted. Overall, it is shown that IMSIs are repeatedly broadcast over time, even though the design of the architecture should dictate that IMSIs should be used sparingly in favor of temporary GUTIs.

Figure 3C:
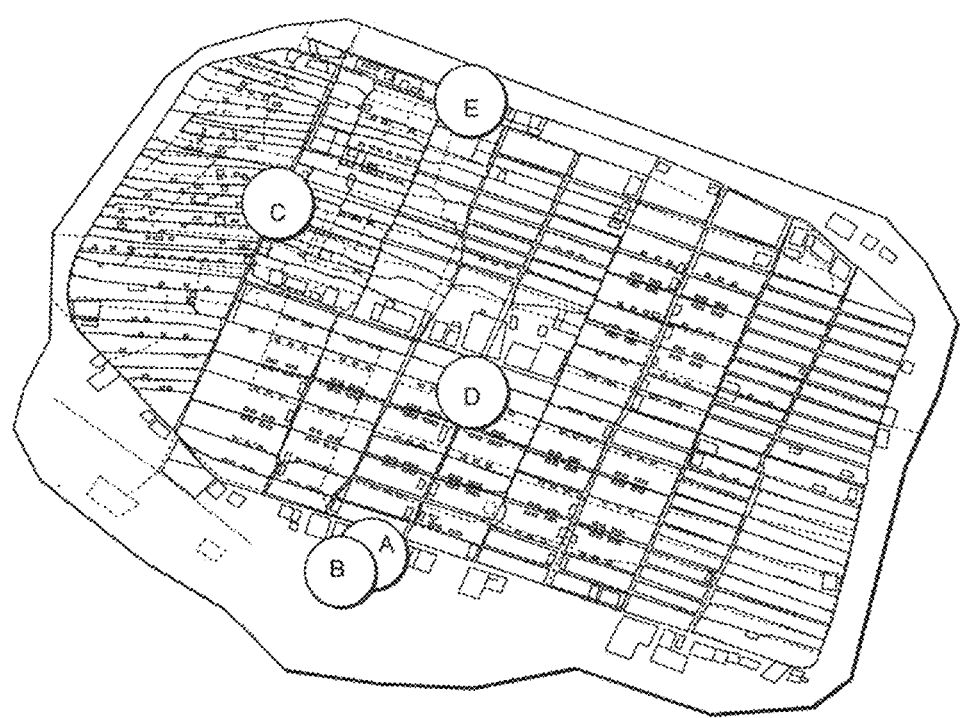
FIG. 3(c) depicts user locations over time according to an embodiment of the present invention.

Individuals Can Be Tracked Over Time:

Given that IMSIs can be tracked over time, a passive attacker can track individuals' movements. FIG. 3(c) shows locations of base stations that broadcast the IMSI for a single user in the traces. As shown, the user was seen in multiple locations over the course of two days. Location A was recorded at 10 am on a Monday; location B was thirty minutes later. The user connected to a base station at location C at noon that same day. Locations D and E were recorded the following day at noon and 1:30 pm, respectively. From this, a passive observer unaffiliated with a cellular carrier can, over time, record the presence and location of nearby users. This attacker is weak, with a relatively small vantage point. In reality, carriers can and do maintain this information for all of their users.

Scope

Many configurations are possible to increase privacy in mobile networks, and no architecture, today or in the future, is likely to provide perfect privacy. Nevertheless, disclosed herein are various properties that PGPP strives to achieve.

Prior work has examined the security vulnerabilities in modern cell networks and revealed several flaws in the architecture itself. In addition, data brokers and major operators alike have taken advantage of the cellular architecture's vulnerabilities to profit off revealing sensitive user data. Mobile networks should aim to, at a minimum, provide one or both of the following privacy properties:
  (1) Identity privacy: A network can aim to protect users' identity. Networks, as well as third party attackers, identify users through IMSIs, which are intended to be uniquely identifying.
  (2) Location privacy: A network can aim to protect information about the whereabouts of a phone.

Naturally, these privacy properties do not exist in isolation; they intersect in critical ways. For example, attackers often aim to learn not only who a user is but where a specific user is currently located, or where a user was when a specific call was made. Also, the definition of an attacker or adversary is a complex one and, depending on context, may include individuals aiming to steal user data, mobile carriers and data brokers looking to profit off user data, governments seeking to perform bulk surveillance, law enforcement seeking to monitor a user with or without due process, and many others. Due to context dependence, it is not expected all privacy-focused mobile networks will make the same choice of tradeoffs.

Cellular Privacy Threat Model:

Given the above discussion, bulk and targeted data collection should be distinguished. Bulk collection is defined as be the collection of information from existing cellular architecture traffic without the introduction of attack traffic; thus, bulk collection is passive. Bulk attacks commonly target user identities (e.g., IMSIs). PGPP's core aim is to protect against bulk attacks. Targeted attacks are active and require injection of traffic to attack specific targets. Targeted attacks are often aimed at discovering a victim's location. Attacks are also delineated by the adversary's capabilities, as they may have visibility into an entire network (global) versus, for an unprivileged attacker, some smaller subset of a network's infrastructure (local). The table in FIG. 4 gives the taxonomy of attacks.

Carriers and governments are the most common global-bulk attackers. Such bulk surveillance is commonplace in cellular networks, and has been at the center of recent lawsuits and privacy concerns. Attacks that employ IMSI catchers or passively listen to broadcasts using software-defined radios are considered local-bulk. Here, an IMSI catcher is only able to monitor phones that connect directly to it, so its visibility is limited to its radio range. Similarly, SDR-based passive snooping is only able to monitor nearby base stations and will miss portions of the network. PGPP is configured with a primary focus on thwarting bulk attacks by nullifying the value of IMSIs, to be described in detail further below.

Local-targeted attacks can be carried out by ordinary users by generating traffic that causes a network to page a victim (e.g., phone call to the victim). As local-targeted attackers do not have visibility into the entire network, they must rely upon knowledge of the geographic area that is encompassed by a tracking area. Due to the prevalence of such attacks, as an enhancement, an operator can provide functionality, in cooperation with the user, that reduces the efficacy of local-targeted attacks through the use of tracking area lists (TALs).

Global-targeted attacks represent a very powerful attacker who can actively probe a victim while having global visibility of the network. It is envisioned defenses against such attacks would require fundamental changes to communication models. PGPP does not mitigate global-targeted attacks as it is focused on immediately deployable solutions.

Aims:

Next the aims of PGPP are discussed by considering several common questions that arise.

What sort of privacy does PGPP provide?

As its name suggests, PGPP aims to provide "pretty good" privacy since a solution that provides perfect privacy, causes no service changes (i.e., does not increase latency), and is incrementally deployable on today's cellular networks likely does not exist. Therefore, the main focus is to offer privacy against global-bulk surveillance of mobility and location, a practice by carriers that is widespread and pernicious. This is thwarted by eliminating the IMSI as an individual identifier and decoupling the authentication and connectivity mechanisms in the cellular architecture.

Isn't 5G more secure than legacy generations?

The 5G standard includes enhancements focused on user privacy and system performance over legacy cellular generations. However, the enhancements do not offer location privacy benefits from the carriers.

Encrypted IMSIs: 5G includes the addition of encrypted IMSIs, where public key cryptography, along with ephemeral keys generated on the SIM, is used to encrypt the IMSI when sending it to the network. This protects user IMSIs from eavesdroppers. However, encrypted IMSIs do not prevent the cellular provider itself from knowing the user's identity. An analogy for encrypted IMSIs can be found in DNS over HTTPS (DoH): eavesdroppers cannot see unencrypted traffic, yet the endpoints (the DNS resolver for DoH, the cellular core in 5G) still can. The goal of this disclosed invention is to not only thwart local-bulk attacks, but also protect user privacy from mobile operators that would otherwise violate it (i.e., global-bulk attacks).

Small cell location privacy: The 5G standard strives for reduced latencies as well as much higher data throughputs. This necessitates the use of cells that cover smaller areas in higher frequency spectrum in order to overcome interference compared with previous cellular generations that used macro-cells to provide coverage to large areas. A (likely unintended) byproduct of 5G's use of smaller cells is a dramatic reduction in location privacy for users. As the 5G network provider maintains state pertaining to the location in the network for a given user for the purposes of paging, smaller cells result in the operator, or attacker, knowing user locations at a much higher precision compared with previous generations.

What about active/traffic analysis/signaling attacks?

While active, targeted attacks are not the main focus here, privacy is improved in the face of them by leveraging TALs to increase and randomize the broadcast domain for paging traffic, making it more difficult for attackers to know where a victim is located. Further, the goal of many active attacks is to learn users' IMSIs, and the nullification of IMSIs renders such attacks meaningless.

An attacker with a tap at the network edge could use traffic analysis attacks to reduce user privacy. This is largely viewed as out of scope as users can tunnel traffic and use other means to hide their data usage patterns.

Cellular networks rely on signaling protocols such as Signaling System 7 (SS7) and Diameter when managing mobility as well as voice and SMS setup and teardown. These protocols enable interoperability between carriers needed for roaming and connectivity across carriers. Unfortunately, these protocols were designed with inherent trust in the network players, and have thus been used to reduce user privacy and disrupt connectivity. PGPP is configured for 4G/5G data only, which renders legacy SS7 compatibility moot. The PGPP configuration expects users to use outside messaging services rather than an in-NGC IMS system.

Can PGPP support roaming?

Yes. While it is envisioned that many PGPP users would explicitly not wish to roam, as roaming partners may not provide privacy guarantees, roaming is possible using a Diameter edge agent that only allows for home routed roaming, forcing traffic to route from the visited network's SMF 30 back to the PGPP operator's UPF 32, rather than local breakout due to the disclosed authentication mechanism. Roaming, and international roaming in particular, adds billing complexities for the PGPP operator. Typically, the visited network collects call data records for each roaming user on its network and calculates the wholesale charges payable by the home network. The visited network then sends a Transferred Account Procedure (TAP) file to the home network via a data clearing house. The home network then pays the visited network. In PGPP, the individual identity of the user that roamed is not known, yet the PGPP operator remains able to pay the appropriate fees to visited networks.

How does PGPP protect user privacy for voice or text service? Out of the box, PGPP does not provide protection for such service. Instead, PGPP aims to provide privacy from the cellular architecture itself, and in doing so users are free to use a third-party voice over Internet protocol (VoIP) provider (in which case the phone will operate identically to a normal phone for telephony service from a user's perspective) or use systems that provide strong metadata privacy guarantees for communications. PGPP can be viewed as complementary to such systems.

How does PGPP protect users against leaky apps?

PGPP does not, as it is about providing protection in the cellular infrastructure. Even without leaky apps, users can always intentionally or inadvertently reveal their identity and location. Leaky apps make this worse as they collect and, sometimes, divulge sensitive user information. PGPP is seen as complementary to work that has targeted privacy in mobile app ecosystems. Further, apps are not as fundamental as connectivity; users can choose whether to install and run a leaky app and can constrain app permissions. However, phones are, by their nature, always connected to carrier networks, and those very networks have been selling user data to third parties.

If users cannot be identified by carriers, how can carriers still make money?

PGPP tokens are introduced further below as a mechanism for a PGPP operator to charge customers while protecting user anonymity.

Cannot phone hardware be tracked as well?

Phones have an International Mobile Equipment Identity (IMEI). The IMEI is assigned to the hardware by the manufacturer and identifies the manufacturer, model, and serial number of a given device. Some operators keep an IMEI database to check whether a device has been reported as stolen, known as an equipment identity register (EIR); IMEIs in the database are blacklisted. For many devices, the IMEI can be changed through software, often without root access. It is envisioned a PGPP MVNO would allow for subscribers to present their unchanged device IMEI, giving the PGPP operator the opportunity to check against a EIR to verify the phone has not been reported as stolen. At that point, the IMEI could be reprogrammed to a single value, similar to the disclosed changes to the IMSI. Note that different jurisdictions have different rules about whether, how, and by whom an IMEI can be changed, so only in some cases IMEI changes require cooperation with the MVNO.

PGPP Configuration

This section describes the mechanisms PGPP employs to increase user identity and location privacy. PGPP is compatible with existing networks and immediately deployable.

In order to provide identity privacy against bulk attacks, the value of the IMSI is nullified, as it is the most common target identifier for attackers. In embodiments of the disclosed invention, all PGPP user IMSIs are set to an identical value to break the link between IMSI and individual users. Alternatively, instead of an identical IMSI, the IMSIs can be algorithmically or randomly generated to preserve user privacy. This change requires a fundamental shift in the architecture, as IMSIs are currently used for connectivity as well as authentication, billing, and voice/SMS routing. As such, a new cellular entity is configured for billing and authentication that preserves identity privacy. Fortunately, the industry push for software-based NGCs makes the disclosed architecture feasible.

To provide location privacy from targeted attacks, PGPP leverages an existing mechanism (TALs) in the cellular specification to grow the broadcast domain for control traffic. By changing the broadcast domain for every user, the potential location of a victim is broadened from the attacker's vantage point.

User Identity Privacy:

As described earlier, IMSIs are globally unique, permanent identifiers. As such, they are routinely targeted by attackers, both legal and illegal. This section illustrates a change to the network architecture to thwart bulk attacks that are based on identifying individuals via IMSI.

Back-end connectivity is decoupled from the authentication procedure that normally occurs at the AUSF 28 when a UE 18, 20 attaches to the network. Instead, the PGPP operator issues SIM cards, eSIMs, or virtual SIMs with identical, algorithmically generated, or randomly generated IMSIs to all of its subscribers. In this model, the IMSI is used only to prove that a user has a valid SIM card to use the infrastructure and, in turn, the PGPP network can provide an IP address and connectivity and offer the client a GUTI, providing the user with a unique identity necessary for basic connectivity.

5G authentication is normally accomplished using IMSIs at the AUSF 28; however, all PGPP users share a single IMSI or have algorithmically or randomly generated IMSIs. Thus, to authenticate a user, a post-attach, oblivious authentication scheme is configured to ensure that the PGPP operator is able to account for the user without knowing who they are.

PGPP Gateway 16: In order to perform this authentication, a new logical entity is created called a PGPP Gateway (PGPPGW) 16, shown in FIG. 1, which sits between the UPF 32 and the public Internet 34. The UPF 32 is configured to have a fixed tunnel to a PGPP-GW 16, which can be located outside of the PGPP operator's network. Using this mechanism, the PGPP-GW 16 only sees an IP address, which is typically network address translated (NATed), and whether that IP address is a valid user. Notably, it does not have any information about the user's IMSI. The PGPP-GW 16 also allows for many different cellular architectures. For instance, multiple PGPP-GWs 16 could be placed in multiple datacenters or even use a privacy service such as Tor.

Authentication properties: From the perspective of the PGPP-GW 16, there are multiple properties an authentication scheme must guarantee: (1) the gateway can authenticate that a user is indeed a valid customer; (2) the gateway and/or any other entities cannot determine the user's identity, and thus cannot link the user's credentials/authentication data with a user identity; and (3) the gateway can determine whether a user is unique or if two users are sharing credentials.

As shown in the table in FIG. 4, the challenge is that standard approaches for authentication only provide one of the three required properties and standard cryptographic mechanisms only provide two of the three properties. For example, an ordinary authentication protocol can provide property (1) but not (2) and (3). A cryptographic mechanism such as group signatures or ring signatures can protect the user's identity upon authentication, providing properties (1) and (2), but not (3) as providing the last property would violate the security of the signature scheme. Similarly, traitor tracing schemes (such as for broadcast encryption) cannot practically provide property (3) as the traitor tracing would require actual physical confiscation of the "traitor" phone by the MVNO, which is infeasible. A variation on ring signatures known as linkable ring signatures provides the ability for a user's identity to be revealed if the user signs multiple messages with the same key. While this is useful in establishing that the user is unique and hasn't shared their credentials, it also partially violates the user's anonymity, as that key cannot be used again.

Effective authentication via cryptocurrency scheme: There are multiple approaches that can be viable, depending on the circumstances. An anonymity-preserving cryptocurrency can provide properties (2) and (3), but not (1) as a cryptocurrency would combine billing and authentication at the PGPP-GW 16. For MVNOs that are not required to know their customers, an anonymity-preserving cryptocurrency may be the ideal solution for both user authentication and payment, though even the best coins provide imperfect anonymity guarantees.

In some settings, the PGPP MVNO does not need or want information about the list of customers that are using its service. In this setting, the service may opt to have no customer list or a partial customer list, where some or all customers provide direct anonymous payment rather than using the token schemes to be described below. A cryptocurrency such as Bitcoin or Zcash would enable such payment, as these cryptocurrencies provide some degree of anonymity for payment and have a monetary value. The PGPP MVNO could thus accept a cryptocurrency payment at time of authentication to let the user onto the network for a fixed period of time.

Effective authentication via PGPP token scheme: To provide all three properties, an approach called PGPP tokens is disclosed herein that helps sidestep the issues with alternative approaches. The choice of authentication scheme is deployment-context specific.

With PGPP tokens, when paying a monthly bill, a user retrieves authentication tokens that are blind signed using Chaum's scheme by a billing system within the PGPP-GW 16. A blind signature system may include the features of true two key digital signature systems combined in a special way with commutative style public key systems. The following three functions make up the blind signature cryptosystem: (1) A signing function s' known only to the signer, and the corresponding publicly known inverse s, such that $s(s'(x))=x$ and s give no clue about s'; (2) A commuting function c and its inverse c', both known only to the provider, such that $c'(s'(c(x)))=s'(x)$, and $c(x)$ and s' give no clue about x; and (3) A redundancy checking predicate r, that checks for sufficient redundancy to make search for valid signatures impractical. The way these functions are used is reminiscent of the way carbon paper lined envelopes are used for physical blind signatures: (1) Provider chooses x at random such that $r(x)$ forms $c(x)$ and supplies $c(x)$ to signer; (2) Signer signs $c(x)$ by applying s' and returns the signed matter $s'(c(x))$ to provider; (3) Provider strips signed matter by application of c', yielding $c'(s'(c(x)))=s'(x)$; and (4) Anyone can check that the stripped matter $s'(x)$ was formed by the signer, by applying the signer's public key s and checking $r(s(s'(x)))$.

Later, when authenticating to the service, the user presents tokens, and the service (the PGPP-GW 16) verifies their signature before allowing the user to use the network. The token scheme ensures that the service can check the validity of tokens without identifying the user requesting access. The user then presents the next token in advance to ensure seamless service. Note that PGPP tokens disallow the post-pay model for cellular billing, as the network would be required to know the identity of users to accurately charge them for usage. Therefore, PGPP is pre-pay only, though this can be adjusted to emulate post-payment (e.g., users pre-pay for tokens on an ongoing basis rather than only monthly, and tokens are valid for a longer time period, such as a year, rather than for only one billing period).

Each token represents a unit of access, as is appropriate for the service provider. Some providers may choose to offer flat-rate unlimited-data service, in which case each token represents a fixed period of time; this is the default approach used to describe the approach below. Other providers may choose to offer metered service, in which case each token represents a fixed unit of data, such as 100 MB or 1 GB, rather than a period of time. Still others may choose to provide two-tiered service priority by marking each token with a priority bit, in addition to either unlimited data or metered data service; such prioritization does come with slight privacy loss, as the MVNO and MNO alike would be able to differentiate which priority level was in use. The privacy loss of two-tiered data priority can be partially mitigated by offering all users some amount of time or GB of high-priority service after which they must fall back to low-priority service; such a service plan structure is fairly standard in the industry today. In such a setting, each user would have both high-priority and low-priority tokens and thus would not be clearly stratified into two identifiable groups of users.

At the beginning of a billing period, the billing system defines s time slices (e.g., corresponding to hours) or another unit of access (e.g., a unit of data) and generates s RSA keypairs for performing blind signatures using Chaum's scheme. It then appends the public keys for this time period to a well-known public repository that is externally maintained (e.g., on GitHub), and these are fetched by users. The user generates s tokens where each token takes the form i∥r where i is the time slice index as a 256-bit unsigned value zero indexed from the beginning of the billing period, and r is a 256-bit random value chosen by the user. The user then blinds these tokens. The user pays the bill using a standard means of payment (e.g., credit card), and presents the blinded tokens to the billing system to be signed; the system signs each token with the corresponding time slice key and returns these values to the user. The user unblinds the response values and verifies the signatures for each.

Upon later authentication to the service, the user presents its signed token for the current time slice to the PGPP-GW 16, which verifies the signature and if valid, begins forwarding the user's traffic onto the Internet 34. Since the token signature was generated using Chaum's scheme, the service cannot determine which human user corresponds to which signed token. If the same token is used by two different users during the same time period then the service can conclude that a user has shared their credentials and is attempting to cheat.

The costs of this scheme to both the PGPP operator and the user are low. The operator stores the list of used tokens in a standard consistent and replicated cloud database, so the service can operate multiple PGPP-GWs 16, though it is likely that a small number of PGPP-GWs 16 can serve a large number of users. The 2048-bit RSA signature verification used here was benchmarked at 31 µs per call using Crypto++ on a single core of a 2.6 GHz Intel Xeon E5-2640 CPU, and thus with a single CPU core the PGPP-GW can handle token verification for tens of millions of users. The tokens themselves are small and the storage cost to the provider is about 1.5 MB/user per time period, which is a small amount for any user's phone to store and for a provider even hundreds of millions of tokens amounts to mere GBs of data in cloud storage.

Effective authentication via alternative PGPP token scheme: In this alternative PGPP token scheme, at the beginning of a billing period, the PGPP-GW 16 divides time in the billing period into s time slices (e.g., hours) and for each time slice it generates n authentication tokens for the k users where n>>k. Each user establishes a secure connection to the billing service to pay their bill, and for each time slice fetches b tokens at random, thereby getting sb tokens, for some small number of b. Upon later authentication to the service, the user presents the b tokens for that time slice to the PGPP-GW 16, and if the tokens are valid, the gateway 16 begins forwarding traffic onto the internet. If the same tokens are used (by two different users), then with high probability a user has shared their credentials and is attempting to cheat.

The probability two users colliding is $$\binom{k}{2}\binom{n}{b}$$

which is $$O\left(\frac{k^2}{n^b}\right);$$

for example, in a network with k=10,000 users and n=100,000 tokens and b=5, the chance any two users' tokens collide by accident in a time slice is one in sixty quadrillion.

As described, this scheme provides properties 1) and 3), but not 2). To provide property 2), the tokens are distributed to users via an oblivious transfer protocol, ensuring that the service does not learn which user received which tokens and that each user only gets the right number of tokens (which would not be guaranteed by a private information retrieval or searchable encryption scheme). In this way, all three desired properties are achieved.

To ensure that real-time user authentication is efficient, the service generates the tokens as message authentication code (MAC) tags using advanced encryption standard (AES) as a pseudorandom function (PRF). Thus, at the start of a billing period the service does the following: the service generates s random symmetric keys $k \leftarrow^\$ \{0,1\}^{128}$ and with each key generates n tokens using AES as a PRF, so each token is (i, $AES_k$ (i)) where i ranges from 1 to n. These tokens are distributed via an oblivious transfer protocol. Later, when a user wishes to authenticate, the user and service do the following to achieve mutual authentication: 1) the user sends the indexes of the b tokens they have for the time slice; 2) the service recomputes the tokens using the indexes the user supplies and the key it has stored, and sends hashes of the tokens back to the user; 3) the user hashes its tokens and checks that they match what the service just sent; and 4) the user sends the tokens to the service, which checks that the tokens are correct. Since this requires only one AES call and one hash call per token, it is very efficient; while oblivious transfer protocols are less efficient, the token distribution phase is batched and not time critical as it occurs only once per billing period.

It should be noted that, in addition to the two schemes described above, blind signatures could be replaced with a cryptographic group signature scheme or a ring signature scheme. Further, the tokens could be distributed using an oblivious protocol such as oblivious transfer or private information retrieval.

User device agent: To automate the process of authenticating with the PGPP-GW 16, a simple agent is created that runs as a background job on the user device 18, 20. This agent leverages the Android Job Scheduler API; in the event of cellular connectivity, the Job Scheduler triggers PGPP-token-based authentication with the PGPP-GW 16. The agent establishes a transport layer security (TLS) connection to the PGPP-GW 16 and then sends the token for the current time slice. Once the user presents a valid token, the PGPP-GW 16 begins forwarding traffic for that user, and thus this behavior is akin to a captive portal though the authentication is automatic and unseen by the user.

Location Privacy:

As described earlier, cellular operators track user location in the form of tracking areas for UEs 18, 20 to quickly find users when there is incoming content. PGPP leverages an existing mechanism in the cellular standard to reduce the effectiveness of local-targeted attacks.

Paging has been exploited in the past to discover user location by adversaries. However, the use of tracking areas is useful for the cellular provider in that it confines the signaling message load (i.e., paging messages) to a relatively small subset of the infrastructure. Tracking areas reduce mobility signaling from UEs 18, 20 as they move through the coverage zone of a single tracking area. Note that emergency calling represents a special case in cellular networks. When a device dials 911, the phone and network attempt to estimate accurate location information. Embodiments described herein do not alter this functionality as it is anticipated that users dialing 911 are willing to reveal their location.

In PGPP, the tracking area list (TAL) concept is expanded upon. Using TALs, a UE 18, 20 no longer belongs to a single tracking area, but rather is given a list of up to 16 tracking areas that it can freely move through without triggering a tracking area update, essentially creating larger tracking areas. Whereas prior work has focused on using TALs to pre-compute optimal tracking area combinations for users, in PGPP, TALs are used to provide improved location anonymity. Typically, TALs include groups of adjacent tracking areas that are pre-computed, essentially growing the tracking area for a UE 18, 20 to the union of all tracking areas in the TAL. For the embodiments described herein, TALs are not used this way. Instead, TALs are generated on-the-fly and uniquely for each UE 18, 20. When a UE 18, 20 attaches or issues a tracking area update message, the AMF 26 learns the gNodeB 22, 24 and tracking area the UE 18, 20 is currently attached to. The AMF 26 then generates a unique TAL by iteratively selecting at random some number (up to the TAL limit of 16) of additional, adjacent tracking areas. By generating unique TALs for each user, attackers are unable to know a priori which set of tracking areas (or gNodeBs 22, 24) that victim is within.

Prototype Embodiment

To study the implications of a PGPP deployment, a simulation is created to model users, mobility, and cell infrastructure. The impact of PGPP's configuration is studied on various cellular attacks that occur today. The inherent tradeoffs from the PGPP operator's perspective are then analyzed, as improved privacy comes at the price of increased control traffic. Lastly, PGPP is examined in a lab testbed on real devices.

Figure 6:
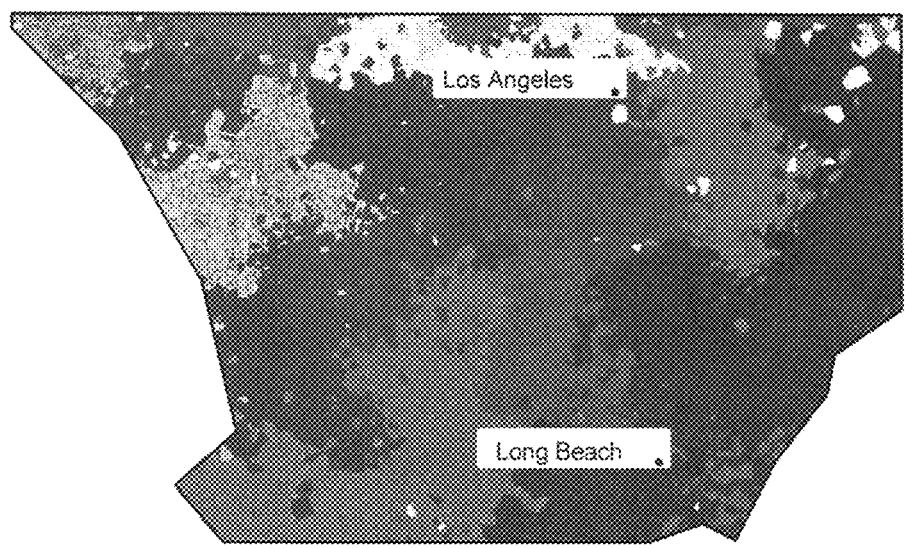
FIG. 6 depicts a partial simulation map according to an embodiment of the present invention.

Simulation Configuration:

gNodeB dataset: Los Angeles County, California is selected as the region for the simulation, which provides a mix of both highly urban areas as well as rural areas. For gNodeB location information, an open database that includes tower locations and carrier information is used, here OpenCellID. To simplify the simulation, base stations are selected from the database that is listed as the provider with the most LTE eNodeBs (22,437) in the region, here AT&T. LTE eNodeBs are used as the number of gNodeBs deployed remains small. Given their geographic coordinates, coverage areas for every gNodeB are estimated using a Voronoi diagram. During the simulation, a UE is assigned to the gNodeB that corresponds to the region the UE is located within. While such discretization is not likely practical, as UEs remain associated with a gNodeB based on received signal strength, this technique provides a tractable mobility simulation. A partial map of the simulation region is shown in FIG. 6. ENodeB regions are shaded based on the tracking area value in the OpenCellID database.

Figure 7:
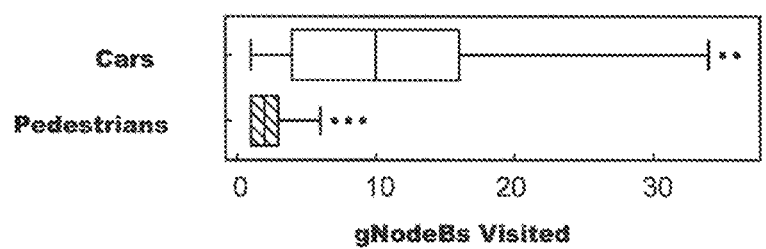
FIG. 7 depicts gNodeBs visited by simulated mobile users according to an embodiment of the present invention.

Mobility traces: To simulate realistic mobility patterns (i.e., users must follow available paths), mobility traces are generated using the application programming interfaces (APIs) Google Places and Directions. First, the Places API is used to find locations in the simulation region that are available when searching for "post office." Each place is associated with latitudinal and longitudinal coordinates. Mobility traces are then generated by randomly selecting start and end points, and the Directions API is used to obtain a polyline with coordinates along with estimated times to reach points along the line. 50,000 mobility traces are generated: 25,000 cars and 25,000 pedestrians. A network simulator ns-3 is then used to process the mobility traces and generate coordinates for each trace at 5-second intervals. This output is used, along with the gNodeB Voronoi diagram to assign each simulated UE to an gNodeB for every 5-second interval in the mobility trace. FIG. 7 shows the distribution of the number of gNodeBs visited by UEs in the simulation. As expected, car trips result in a significantly higher number of gNodeBs for a UE compared with pedestrian trips.

Synthetic traffic: One hour is simulated. To create control traffic, at every 5-second interval, 5% of the user population is randomly selected to receive a "call." A call results in a paging message that is sent to all gNodeBs in the UE's tracking area. Each paged user enters a 3-minute "call" if it is not already in one, at which point further paging messages are suppressed for that user until the call is complete. The simulation is run with PGPP enabled as well as with a standard infrastructure setup.

Custom TAs: As detailed further below, large TALs increase control traffic loads, which lowers the network's user capacity. Therefore, new tracking areas are generated in the underlying network to mitigate the control traffic burden. As tracking areas normally include groups of adjacent gNodeBs, a method is needed by which nearby gNodeBs can be clustered into logical groupings. To do so, k-means clustering is used with the gNodeB geographic coordinates allowing for Euclidean distance to be calculated between gNodeBs. Several underlying tracking area maps are generated, with the number of TAs (i.e., k-means centers) ranging from 25 to 1,000. For comparison, the AT&T LTE network in the simulation includes 113 TAs.

Cellular Privacy Attack Analysis:

The identity and location privacy benefits of PGPP are analyzed in the simulated environment.

Global-bulk attacks: By nullifying the value of IMSIs, separating authentication with connectivity, and increasing the broadcast domain for users, user identity privacy is increased even with an adversary that is capable of bulk surveillance over an entire network (e.g., operators, governments).

The anonymity of a user when under bulk attacks is measured using degree of anonymity. The degree of anonymity value ranges from zero to one, with ideal anonymity being one, meaning the user could be any member of the population with equal probability. In this case, the IMSI value is considered to be the target identity. The size of the anonymity set for a population of N users will result in a maximum entropy of:

$$H_M = \log_2(N) \tag{1}$$

The degree of anonymity is determined based on the size of the subset of user identities S that an attacker could possibly believe the victim to be:

$$d = \frac{H(X)}{H_M} = \frac{\log_2(S)}{\log_2(N)} \tag{2}$$

Figure 8A:
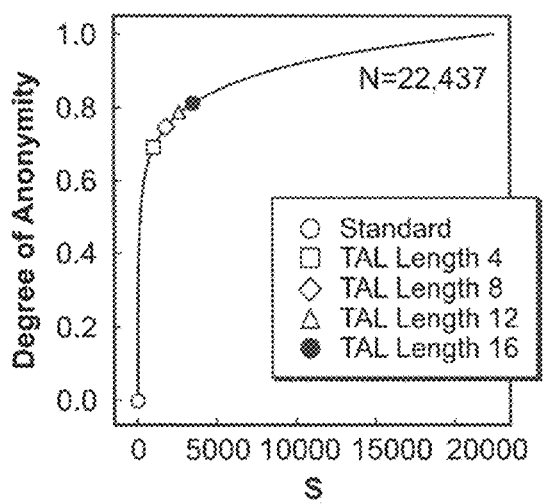
FIG. 8(a) depicts degree of anonymity using TALs according to an embodiment of the present invention.
Figure 8B:
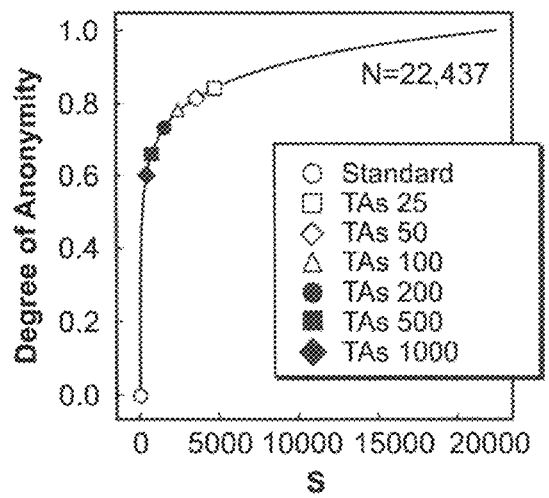
FIG. 8(b) depicts degree of anonymity using custom TALs according to an embodiment of the present invention.

Given global visibility into the network, the anonymity set can be determined using the number of gNodeBs that a victim could possibly be connected to. This is because a cellular carrier can know the exact base station that a user is connected to once the UE enters an active state. As a baseline, the anonymity set for traditional cellular is $$\frac{\log_2(1)}{\log_2(22{,}437)} = 0,$$

as each IMSI is a unique value. With PGPP, IMSIs are identical, so from the perspective of the carrier, the victim could be connected to any gNodeB that has at least one PGPP client connected to it. Using the simulated environment, for each paging message, the number of gNodeBs that had users within their range is collected and the median value is used to calculate the degree of anonymity. FIGS. 8(a) and 8(b) show the degree of anonymity using different configurations of TALs and custom TAs, respectively. It is shown that high degrees of anonymity are attainable despite an attacker's global visibility. For instance, with TALs of length 8, the degree of anonymity is 0.748.

Local-bulk attacks: PGPP's use of identical IMSIs reduces the importance of IMSIs, and by extension the usefulness of local bulk attacks on user identity. An attacker that can view traffic at the gNodeB(s) can gain insight into nearby IMSIs.

In traditional cell networks, each user has a globally unique IMSI (S=1), resulting in a degree of anonymity of zero as the victim could only be one user. Here, it was shown that IMSIs are routinely broadcast over cell networks, making an IMSI catcher or SDR attack powerful. The subset S in PGPP, on the other hand, is the size of the population of PGPP users in a given location, as all IMSI values are identical and a local bulk attacker cannot know the true identity of a single user. To get an idea of S, the number of PGPP users connected to each gNodeB can be calculated in the simulation. Over the course of the simulation, a mean value of 223.09 users connected to each gNodeB that has users is found, which results in a degree of anonymity $$\frac{\log_2(223.09)}{\log_2(50{,}000)} = 0.50.$$

While this value is somewhat low compared to the ideal value of 1, it is a drastic improvement over standard cellular architecture, and is dependent on the overall user population in the network. As more PGPP users exist, the degree of anonymity increases.

Local-targeted attacks: In PGPP, local-targeted attacks to discover a user's location are diminished in two ways: first, IMSIs are no longer a useful ID, so identifying an individual among all users is challenging; and second, TALs are used to increase the paging broadcast domain for a given UE. From an attacker's point of view, this broadens the scope of where the target UE may be located.

Figure 9A:
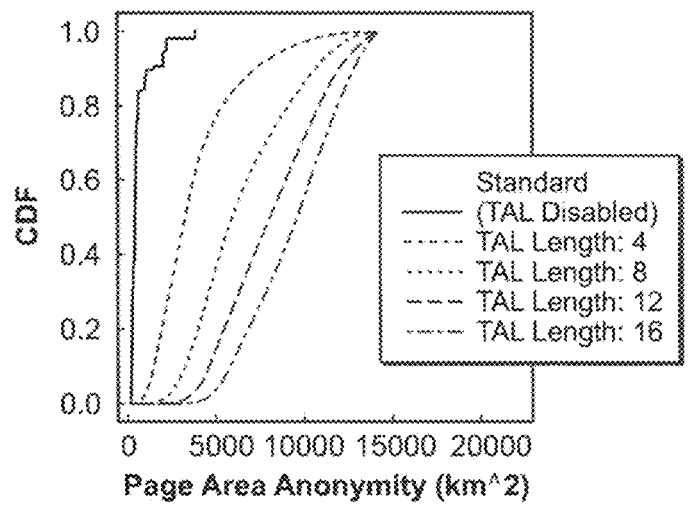
FIG. 9(a) depicts area anonymity using TALs according to an embodiment of the present invention.

In FIG. 9(a), the CDF of geographic areas is plotted in which pages are broadcast as TAL lengths are increased using the base map including 113 tracking areas. The area is calculated by generating a bounding box around all gNodeBs that are included in the broadcast domain. As shown, large TALs result in drastically higher area anonymity compared with TALs disabled, particularly considering the number of UEs that could potentially be located in the larger geographic areas. For instance, the median area for the standard simulation is 378.09 km² whereas TAL lengths of 8 and 16 result in median areas of 5,876.96 and 9,585.17 km², respectively.

Figure 9B:
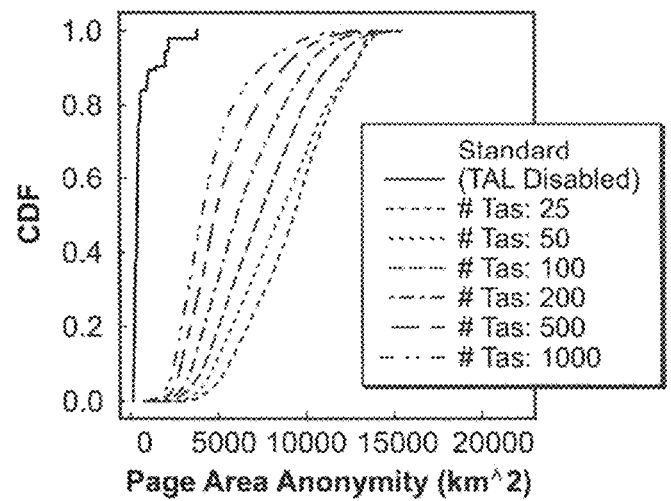
FIG. 9(b) depicts area anonymity using custom TALs according to an embodiment of the present invention.

Anonymity is analyzed with TALs of length 16 while the underlying map is varied using custom TAs. FIG. 9(b) shows the results. It is observed that as the number of tracking areas increase, resulting in smaller tracking areas, the area anonymity decreases. However, despite the decrease, the area anonymity remains considerably larger than anonymity with TALs disabled as TALs include additional tracking areas. For instance, the median area for the standard case is 378.09 km² whereas the median area for a base map of 500 tracking areas with TAL 16 is 4891.08 km², a nearly 13-fold increase from the perspective of a local targeted attacker.

Impact of PGPP on Network Capacity:

From an operational perspective, the privacy benefits delivered by PGPP must coincide with feasibility in terms of control overhead for it to be deployable. Control traffic determines network capacity in terms of the number of users that are serviceable in a given area. This section explores control traffic load when using TALs.

Control overhead with PGPP TALs: It is first sought to quantify control message overhead while tracking area lists are leveraged to provide location anonymity against local-targeted attacks. Recall from earlier that additional tracking areas are randomly selected from the simulated coverage area to create TALs, which increases the broadcast domain for a page. Increased control traffic impacts both gNodeBs and AMFs; however, with real cellular networks the control traffic capacity at gNodeBs is the bottleneck as AMFs have much higher capacity. Thus, the focus here is on gNodeB control load.

Figure 10A:
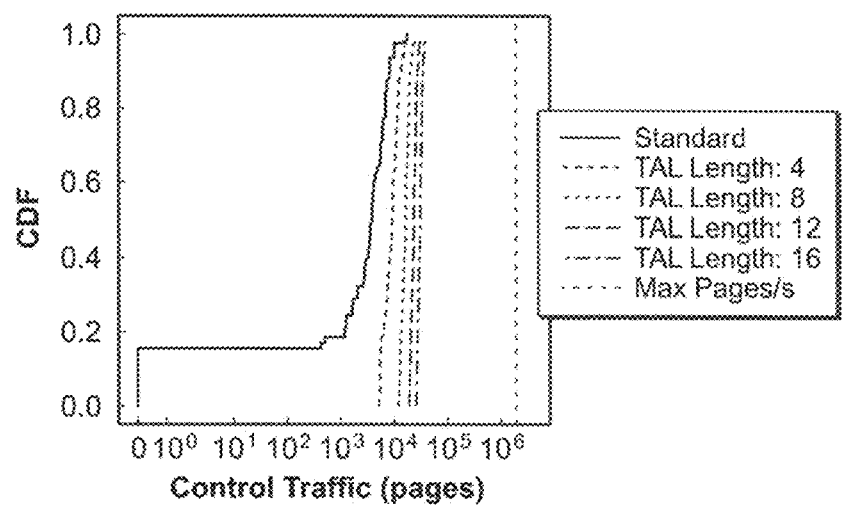
FIG. 10(a) depicts control traffic leveraging TALs according to an embodiment of the present invention.

FIG. 10(a) shows CDF for the number of pages broadcast by the simulated gNodeBs. In the figure, "Standard" corresponds to disabling TAL functionality. As expected, larger TAL lengths result in increased control traffic for gNodeBs as they are more likely to be included in the paging broadcast domain for a given UE.

Figure 10B:
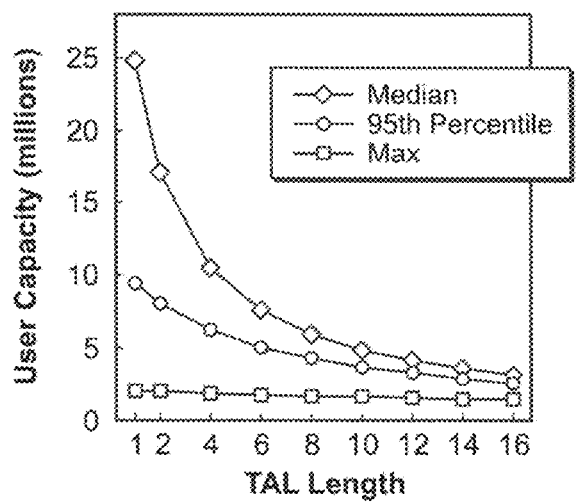
FIG. 10(b) depicts system capacities leveraging TALs according to an embodiment of the present invention.

To gain insight into the control limitations of real gNodeBs, the capabilities of a Huawei BTS3202E eNodeB is considered, which is limited to 750 pages per second. When capacity planning, it is commonplace to budget paging traffic headroom; accordingly, the maximum paging capacity for a gNodeB is estimated to be 525 pages per second (70% of the BTS3202E capacity). This value is depicted in the vertical line in the figure (525 pages×3600 seconds=1,890,000 pages/hour). The simulation allows for illustrating the user population that could be supported by the network when provided with a population with similar mobility and traffic profiles as defined earlier. Recall that 50,000 users, both pedestrians and cars, were simulated. The paging load for the network is considered and the gNodeBs with the maximum paging load, the 95th percentile, and the median are selected to estimate the number of users each could theoretically support by taking into account the max page limitation of the BS3202E. FIG. 10(b) shows the user capacity as TAL lengths are increased. A TAL length of one shows the standard network, as the TAL includes a single tracking area. As expected, larger TALs result in a reduction in the number of users the gNodeBs can handle compared with performance when TALs are disabled, due to increased paging load.

Control overhead with custom tracking areas: As demonstrated, large TALs result in gNodeBs with higher control traffic load, effectively reducing the user capacity the network can handle. To explore whether control traffic can be regained, again new, custom tracking area maps are considered that are generated using k-means where the number of unique tracking areas in the simulated network are varied.

Figure 11A:
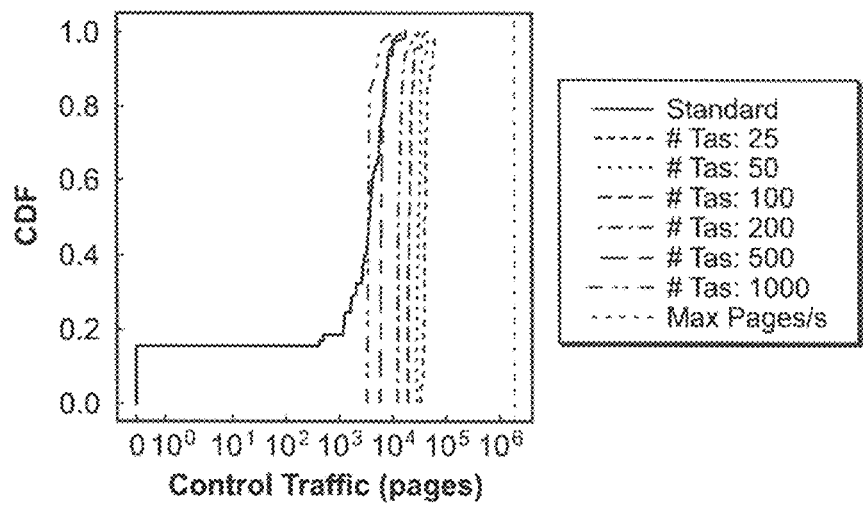
FIG. 11(a) depicts control traffic leveraging custom TALs according to an embodiment of the present invention.
Figure 11B:
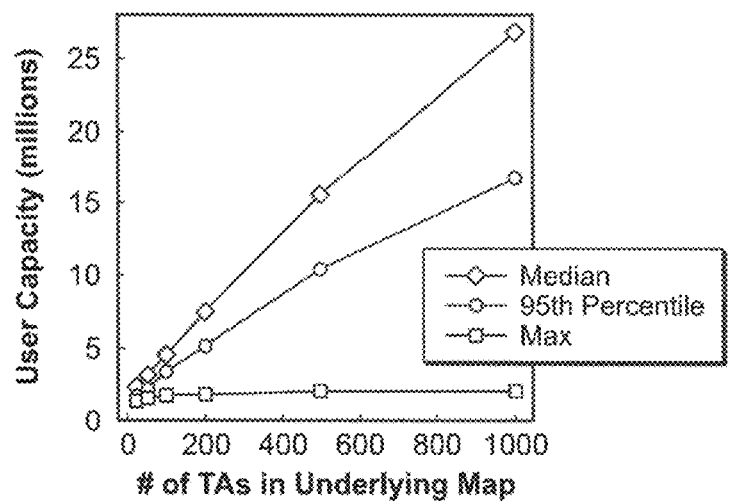
FIG. 11(b) depicts system capacities leveraging custom TALs according to an embodiment of the present invention.

The simulation is run with various custom tracking area maps, with all UEs using TAL lengths of 16. The results are shown in FIGS. 11(a) and 11(b). It is observed that a base-map including 25 tracking areas leads to even higher control traffic compared with the standard (i.e., AT&T) tracking area map. A map including more tracking areas results in TAs with fewer gNodeBs, thus reducing the paging load. A map of 500 TAs, even with a TAL of length 16, results in similar paging load compared with the standard map with TAL disabled. Correspondingly, the user capacity of the network with a higher number of tracking areas nears the standard capacity from FIG. 10(b).

Testbed Analysis:

The PGPP configuration is studied on a lab testbed to understand potential drawbacks. A software-based NGC is implemented, and commodity phones are connected to the software-defined radio-based gNodeB.

Figure 12:
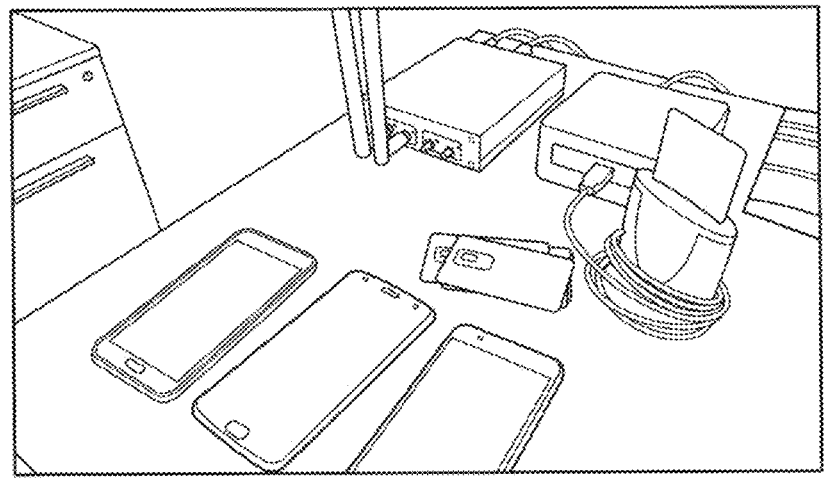
FIG. 12 depicts a PGPP prototype test hardware according to an embodiment of the present invention.

Prototype: The prototype code is created on an open-source platform that implements LTE-compliant base station and core network functionality, srsLTE, and can be run using software-defined radios4. The testbed, shown in FIG. 12, includes Intel Core i7 machine running Linux and a USRP B210 radio. Off-the-shelf commodity phones (Moto X4, Samsung Galaxy S6, and two OnePlus 5s) are used with programmable SIM cards installed to allow the phones to connect to the PGPP network.

SrsLTE maintains contexts for each connected UE related to mobility and connectivity. The contexts are stored as structs that include the UE IMSI in a simple key-value store, with the IMSI serving as the key. When the AMF receives mobility-related messages, it checks against the appropriate contexts to handle the requests. An additional value, a PGPPIMSI, is added into the context structs. The PGPPIMSI is generated by combining the IMSI with a temporary value that is unique to the individual UE-gNodeB-AMF connection. Accordingly, each UE has a unique PGPPIMSI, which then allows for looking up the correct context when managing states.

Identical IMSIs and Shared Keys: Given identical IMSI values for all users, the PGPP attach procedure can result in additional steps compared with the traditional attach. This is caused by sequence number synchronization checks during the authentication and key agreement (AKA) procedure, which is designed to allow the UE and the network to authenticate each other. The fundamental issue is that the AUSF and the SIM maintain a sequence number (SQN) value that both entities increment with each successful attach. As multiple devices use the same IMSIs, the sequence numbers held at the AUSF and on individual devices will no longer match, causing an authentication failure (known as a sync_failure). At that point, the UE re-synchronizes with the AUSF.

Figure 13:
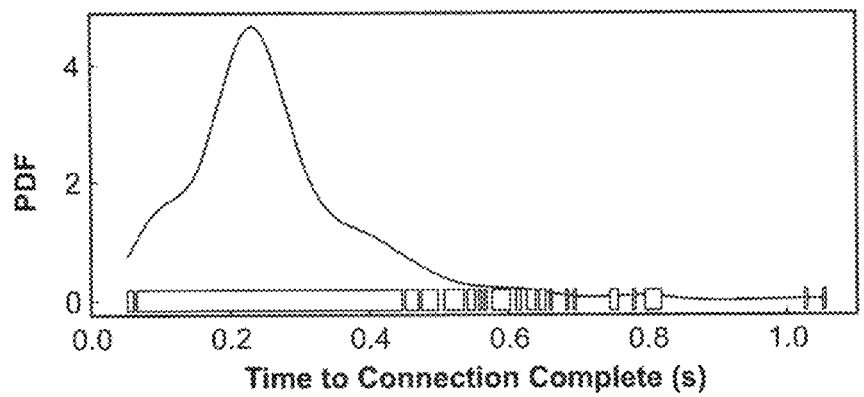
FIG. 13 depicts connection delays due to sync_failure according to an embodiment of the present invention.

The delay introduced by sync_failures is explored using the testbed. FIG. 13 shows a PDF of the delays to connection completion for UEs that hold identical IMSIs and attempt to authenticate simultaneously. To trigger many simultaneous authentication requests, openairinterface5G is used to create 100 simulated UEs. It is observed that the first successful UE usually takes roughly 200 ms to connect, while subsequent UEs that experienced sync_failures experience additional delays. In our relatively small experiment the UEs all successfully connect to the network within 1.1 seconds. In a large-scale production network the number of UEs that simultaneously attempt to connect would be larger. PGPP-based networks can mitigate the issue by using more AUSFes, which would reduce the number of UEs that each AUSF is responsible for. Fortunately, the push for 5G will lend itself to many AUSFes as the core network entities are being redesigned to be virtualized and located nearer to UEs.

Advantages Over Prior Work

Prior work on anonymous communications often traded off latency and anonymity. Likewise, Tor and Mixnets also result in increased latency while improving anonymity. However, such solutions are inappropriate for cellular systems as, apart from SMS, cellular use cases require low latency. Additionally, the architecture continues to utilize identifiers (e.g., IMSI) that can expose the user to IMSI catcher attack or allow for location tracking by the operator.

There has been extensive prior work on finding security and privacy issues in cellular networks. Embodiments of the invention disclosed herein decouple the IMSI from the subscriber by setting it to a single value for all users of the network. Altering the IMSI to specifically thwart IMSI catcher and similar passive attacks has been previously proposed. These techniques use pseudo-IMSIs (PMSIs), which are kept synchronized between the SIM and the AUSF, or hypothetical virtual SIMs, allowing for user identification. However, embodiments of the disclosed invention go beyond simply thwarting IMSI catchers and do so while considering active attacks without requiring fundamental changes on the UE; embodiments of the disclosed invention even protect users from the operator itself.

A TORPEDO attack was introduced, which allows attackers to identify the page frame index and using that, the presence or absence of a victim in a paging broadcast area (i.e., a tracking area). However, the disclosed use of tracking area lists to provide additional paging anonymity increases the location in which a victim could potentially be, reducing the effectiveness of third-party paging-related localization attacks. A PIERCER attack was also introduced, which enables the attacker to reveal a victim's IMSI with only their phone number. PGPP nullifies this attack by making all IMSIs identical. Cellular signaling protocols have been demonstrated by multiple works to leave users' privacy vulnerable to attack. The disclosed configuration avoids signaling protocol vulnerabilities by providing data-only rather than voice/SMS, and roaming to other networks can be enabled by requiring home-routing rather than local breakout. 5G vulnerability has been identified that allows an attacker to neutralize GUTI refreshment. However, this requires a MiTM attack (e.g., IMSI catcher), which necessarily means the attacker knows the victim's location. Additionally, the GUTI is a temporary identifier, and is not associated with a specific user.

Other prior works alter IMSI values; however, they require substantial changes to network entities. A privacy-preserving architecture must be fully compatible with existing infrastructure as the global telecom infrastructure is truly a network of networks, including multiple operators that connect via well-known APIs.

Conclusion

User privacy is a hotly contested topic today, especially as law enforcement organizations, particularly in authoritarian states, insist upon increasingly ubiquitous surveillance. In addition, law enforcement has long demanded backdoor access to private user devices and user data. PGPP would likely limit the ability of such organizations to continue to operate a regime of mass surveillance of user mobility. In addition, a more common and problematic form of privacy loss today is due to the surreptitious sale of user data by network providers; this is a matter PGPP addresses in a manner that aligns with user autonomy. The goal is to improve privacy in line with prior societal norms and user expectations, and to present an approach in which privacy-enhanced service can be seamlessly deployed.

As such, generally disclosed herein are embodiments for a system and method that enable protection of user identity and location privacy by decoupling points in the cellular architecture.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A cellular architecture for enhanced privacy regarding identity and location of a computing device, the architecture comprising:
    a next generation core (NGC), comprising:
        an authentication server function (AUSF) configured to determine whether the computing device contains a valid subscriber identity module (SIM) card; and
        a user plane function (UPF) configured to allow a computing device to connect to the Internet; and
    a gateway connected to the UPF, the gateway controlling device access to the public internet via the UPF, the gateway configured to authenticate the computing device while hiding the identity of the computing device by verifying oblivious authentication tokens that represent units of access, the gateway configured to not have access to any network identifier of the computing device, and only see the external IP address associated with the device.

2. The cellular architecture of claim 1, wherein the AUSF is configured to determine whether the computing device contains a valid SIM card by receiving one of an identical international mobile subscriber identity (IMSI), an algorithmically generated IMSI, and a randomly generated IMSI from the computing device.

3. The cellular architecture of claim 1, further comprising an access and mobility management function (AMF) configured to provide a globally unique temporary identifier (GUTI) to the computing device.

4. The cellular architecture of claim 3, wherein the AMF is further configured to generate a unique tracking area list (TAL) for the computing device.

5. The cellular architecture of claim 1, further comprising a session management function (SMF) configured to provide an Internet protocol (IP) address to the computing device.

6. The cellular architecture of claim 1, wherein the gateway is further connected to the public Internet.

7. The cellular architecture of claim 1, further comprising a next generation radio access network (NG-RAN) comprising at least one serving base station (gNodeB) for allowing the computing device to connect to the NGC.

8. The cellular architecture of claim 1, wherein the authentication tokens are verified by being blind signed using Chaum's scheme by a billing system.

9. The cellular architecture of claim 1, wherein the authentication tokens are distributed via an oblivious transfer protocol.

10. The cellular architecture of claim 1, wherein the units of access comprise at least one of a fixed period of time and a fixed unit of data.

11. A method for providing enhanced privacy regarding identity and location of a computing device in a cellular architecture, the architecture including a next generation core (NGC) and a gateway, the NGC including an authentication server function (AUSF) and user plane function (UPF), the method comprising:
    determining via the AUSF whether the computing device contains a valid subscriber identity module (SIM) card;
    authenticating via the gateway the computing device while hiding the identity of the computing device by verifying oblivious authentication tokens that represent units of access, the gateway configured to not have access to any network identifier of the computing device, and only see the external IP address associated with the device; and
    allowing via the UPF a computing device to connect to the Internet.

12. The method of claim 11, wherein determining whether the computing device contains a valid SIM card further comprises receiving via the AUSF one of an identical international mobile subscriber identity (IMSI), an algorithmically generated IMSI, and a randomly generated IMSI from the computing device.

13. The method of claim 11, further comprising providing via an access and mobility management function (AMF) of the NGC a globally unique temporary identifier (GUTI) to the computing device.

14. The method of claim 13, further comprising generating via the AMF a unique tracking area list (TAL) for the computing device.

15. The method of claim 11, further comprising providing via a session management function (SMF) an Internet protocol (IP) address to the computing device.

16. The method of claim 11, further comprising allowing via at least one serving base station (gNodeB) the computing device to connect to the NGC.

17. The method of claim 11, wherein verifying the authentication tokens further comprises blind signing via a billing system the authentication tokens using Chaum's scheme.

18. The method of claim 11, further comprising distributing the authentication tokens via an oblivious transfer protocol.

19. A cellular architecture for enhanced privacy regarding identity and location of a computing device, the architecture comprising:
    a cellular core, comprising:
        a back-end authentication database configured to determine whether the computing device contains a valid subscriber identity module (SIM) card; and
        a core packet forwarding gateway configured to allow a computing device to connect to the Internet; and
    a privacy gateway connected to the core packet forwarding gateway, the privacy gateway configured to authenticate the computing device while hiding the identity of the computing device by verifying oblivious authentication tokens that represent units of access, the gateway configured to not have access to any network identifier of the computing device, and only see the external IP address associated with the device.

20. The cellular architecture of claim 19, wherein the back-end authentication database is configured to determine whether the computing device contains a valid SIM card by receiving one of an identical international mobile subscriber identity (IMSI), an algorithmically generated IMSI, and a randomly generated IMSI from the computing device.

21. The cellular architecture of claim 19, further comprising an entity responsible for mobility management, the entity configured to provide a globally unique temporary identifier (GUTI) to the computing device.

22. The cellular architecture of claim 21, wherein the entity is further configured to generate a unique tracking area list (TAL) for the computing device.

23. The cellular architecture of claim 19, further comprising an entity for internally managing session connectivity configured to provide an Internet protocol (IP) address to the computing device.

24. The cellular architecture of claim 19, wherein the privacy gateway is further connected to the public Internet.

25. The cellular architecture of claim 19, further comprising a radio access network (RAN) comprising at least one serving base station (gNodeB) for allowing the computing device to connect to the cellular core.

26. The cellular architecture of claim 19, wherein the authentication tokens are verified by being blind signed using Chaum's scheme by a billing system.

27. The cellular architecture of claim 19, wherein the authentication tokens are distributed via an oblivious transfer protocol.

28. The cellular architecture of claim 19, wherein the units of access comprise at least one of a fixed period of time and a fixed unit of data.

* * * * *